3,538,222
TEMPERATURE REDUCING COMPOSITIONS
AND METHODS EMPLOYING 1,3-OXAZOLI-
DIN-2-ONES
Julius G. Shukys, Chatham, N.J., assignor to Air Re-
duction Company, Incorporated, New York, N.Y., a
corporation of New York
No Drawing. Filed Dec. 29, 1967, Ser. No. 694,359
Int. Cl. A61k 27/00
U.S. Cl. 424—272          6 Claims

ABSTRACT OF THE DISCLOSURE

This aplication relates to compositions containing 4,5,5-trimethyl-4-hydroxy-1,3-oxazolidin-2-one, 4,5,5-trimethyl-4-hydroxy-3-hydroxyethyl-1,3-oxazolidin-2-one or 4,5,5 - trimethyl - 4 - hydroxy - 3 - N - morpholinoethyl-1,3-oxazolidin-2-one and a pharmaceutically acceptable carrier for use in lowering the body temperature of warm-blooded mammals and to the method of using such compositions to lower the body temperature.

DESCRIPTION OF THE INVENTION

The present invention relates to compositions containing substituted 1,3-oxazolidin-2-ones which are useful for lowering the body temperature of warm-blooded mammals. The specific 1,3-oxazolidin-2-ones of interest to the present invention have the following generic formula:

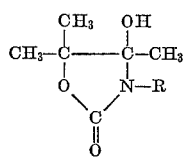

where R = (a) H
(b) —CH$_2$CH$_2$OH
(c) —CH$_2$CH$_2$—N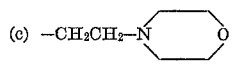O

The compound corresponding to (a) is 4,5,5-trimethyl-4-hydroxy-1,3-oxazolidin-2-one. The compound is a white crystalline material which is soluble in water. It has an empirical formula C$_6$H$_{11}$O$_3$N, a molecular weight of 145.15 and a melting point of 119–121° C.

The compound corresponding to (b) is 4,5,5-trimethyl-4-hydroxy-3-hydroxyethyl-1,3-oxazolidin-2-one. The compound is a white crystalline material which is soluble in water. It has an empirical formula C$_8$H$_{15}$O$_4$N, a molecular weight of 189.2 and a melting point of 81–82° C.

The compound corresponding to (c) is 4,5,5-trimethyl-4 - hydroxy - 3 - N - morpholinoethyl - 1,3 - oxazolidin-2-one. The compound is a white crystalline material which is soluble in water. It has an empirical formula C$_{12}$H$_{22}$O$_4$N$_2$, a molecular weight of 258.3, and a melting point of 118.2–120° C.

The compounds used in preparing the compositions of the present invention can be prepared by reacting ammonia or a primary amine, containing the moiety to be added, with 4-methylene-5,5-dimethyl-1,3-dioxolan-2-one according to the following equations:

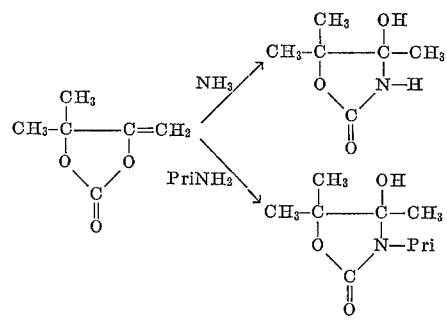

The starting material 4-methylene-5,5-dimethyl-1,3-dioxolan-2-one is a know material which is readily prepared by reacting a tertiary acetylenic alcohol whose hydroxy group is adjacent to the triple bond with carbon dioxide under pressure and in the presence of copper compounds and amines as described in U.S. Pat. No. 3,082,216.

The following examples will illustrate the preparation of the compounds of interest to the present invention from the common starting material:

EXAMPLE 1

Preparation of 4,5,5-trimethyl-4-hydroxy-1,3-
oxazolidin-2-one

A solution of 4-methylene-5,5-dimethyl-1,3-dioxolan-2-one (60.5 g., 0.47 mole) in 180 ml. of benzene was heated to and maintained at 40–50° C. in a flask equipped with a thermometer, a mechanical stirrer, and a "Dry Ice" cooled condenser. Gaseous ammonia was then passed into the flask over a period of 13 hours. On completion of the reaction a white crystalline product was collected and washed with cold benzene. The yield was 66.8 g. (97.3%) of a material with a melting range of 114–123.5° C. The product was then purified by crystallization from a benzene-petroleum ether solution to yield a white crystalline solid with a melting point of 119–121° C. The empirical formula was determined through elemental analysis and found to be C$_6$H$_{11}$O$_3$N.

EXAMPLE 2

Preparation of 4,5,5-trimethyl-4-hydroxy-3-hydroxy-
ethyl-1,3-oxazolidin-2-one

One-half mole (0.5 mole) of freshly distilled amino-ethanol was added dropwise and with stirring to 0.5 mole of 4-methylene-5,5-dimethyl-1,3-dioxolan-2-one in 190 ml. of benzene. The reaction product, isolated by vacuum evaporation of the solvent, melted at 74.2–79.2° C. After two crystallizations from a carbon tetrachloride-chloroform mixture the product melted at 81–82° C. Following elemental analysis the empirical formula was determined to be C$_8$H$_{15}$O$_4$N.

EXAMPLE 3

Preparation of 4,5,5-trimethyl-3-N-morpholinoethyl-
4-hydroxy-1,3-oxazolidin-2-one To a solution of 10 g. of 2-morpholinoethylamine in 25 ml. of benzene there was added in several small portions 11.5 g. of 4-methylene-5,5-dimethyl-1,3-dioxolan-2-one. The reaction flask was occasionally immersed in a cold water bath during the addition to dissipate the heat of the reaction. Following the addition and when the temperature of the reaction mixture began to drop, the flask was heated in a hot water bath for a short time. The flask was then set aside to cool for several hours at room temperature.

The following day, the mixture was heated on a steam bath for approximately one-half hour and then cooled in "Dry Ice" until the mixture solidified. The benzene and any unreacted starting material were then separated by heating the mixture, in the flask, to 73° C. at less than 1 mm. of mercury.

The residue, melting at 110–118° C., amounted to 22.1 g. The purified product obtained by crystallization from a hexane-acetone solution melted at 118.2–120° C. The empirical formula was determined through elemental analysis and found to be $C_{12}H_{12}O_4N_2$.

Before testing any of the compounds for use in lowering the body temperature of warm-blooded mammals the $LD_{50}$ of each compound was determined. The $LD_{50}$ corresponds to the amount of the compound necessary to kill 50% of the mice tested in a given period of time. Compounds (a) and (c) were found to have an $LD_{50}$ of greater than 5000 mg./kg. and compound (b) was found to have an $LD_{50}$ of greater than 10,000 mg./kg. indicating they were extremely safe for use in testing. The animal tests were then carried out using and effective amount ranging $\frac{1}{20}$ to $\frac{1}{5}$ the $LD_{50}$.

In order to test the effectiveness of the compositions of the present invention in lowering the body temperature of warm blooded animals, solutions of the compounds were prepared in a pharmaceutically acceptable carrier. Since all of the compounds of interest are water soluble, water serves as a convenient carrier. Any other pharmaceutically acceptable carrier in which the compounds are soluble would also be suitable, for example, an isotonic saline solution. The composition can also be prepared as emulsions employing pharmaceutical carriers in which the compounds are insoluble.

The compositions of the present invention were tested on groups of CF1-S adult female mice. While there was considerable variations in the temperatures of the CF1-S mice that were used, the variation was within limits. A study showed that on any particular day 75% of the body temperatures lie within a 3.5° F. range, and only one mouse in 20 had a temperature more than 2° F. outside of that central range. A mouse with a temperature in the range of 99.0–102.5° F. was considered normal and suitable for use in testing the administration of the compositions. Deviation of the temperature by more than 2° F. outside of that range was considered definitive evidence for disturbance of the temperature control center.

In the tests, the initial pretreatment rectal temperature were taken by means of an electric thermometer and a small-animal probe. Any mouse with an initial temperature out side of the normal range was discarded. The effects of testing the composition of the present invention were compared with the effect of injecting control mice with water.

The effectiveness of the compositions of the present invention in controlling body temperature is illustrated by the following examples:

EXAMPLE A (a) 4,5,5-trimethyl-4-hydroxy-1,3-oxazolidin-2-one

The initial pre-treatment temperature was recorded for each experimental animal rectum utilizing a Model 43 TA Tele-Thermometer and a small animal thermistor probe. Any mouse with an initial temperature outside of the normal range was discarded. Following injection of the test composition, temperatures were recorded at 20-, 40-, and 60-minute intervals. The following table illustrates the results obtained:

| Agent | Dose | Average deviation from initial temperature, ° C. |
|---|---|---|
| Water | 10 ml./kg | +0.50 to −1.25. |
| (a) | 300 mg./kg | +0.00 to −1.75. |
| (a) | 600 mg./kg | +0.00 to −3.75. |

The test clearly indicates that 4,5,5-trimethyl-4-hydroxy-1,3-oxazolidin-2-one demonstrates a dose related hypothermic activity.

EXAMPLE B (b) 4,5,5-trimethyl-4-hydroxy-3-hydroxyethyl-1,3-oxazolidin-2-one

Following the intraperitoneal injection of 2000 mg./kg. of (b) into adult CFI female mice, the body temperature fell 2.5° C. within the first half hour, remained reduced by 2.25° C. for one hour, and then started to rise so that at one and one half hours after treatment it was 1.25° C. below the initial temperature. The average response of the water treated controls and of untreated mice was a depression in body temperature of 0.25–0.5° C. at each time interval. Whatever the starting temperature of the mice it immediately dropped at least 2° C. upon administration of (b).

EXAMPLE C (c) 4,5,5-trimethyl-4-hydroxy-3-N-morpholinoethyl-1,3-oxazolidin-2-one In the test the initial pretreatment rectal temperature of mice was taken with an electric thermometer and a small animal probe. The effect of the composition was then compared with the effect of injecting control mice with water. The following table illustrates the results obtained:

| Agent | Dose | Average change in temperature (° F.) | | |
|---|---|---|---|---|
| | | 30 min. | 60 min. | 90 min. |
| Water | 10 ml./kg | −2.0 | −1.0 | −0.5 |
| (c) | 500 mg./kg | −6.6 | −6.4 | −6.8 |
| (c) | 1000 mg./kg | 5.0 | −4.8 | −5.0 |

The results of the test clearly indicate that the administration of (c) caused an immediate prolonged hypothermic effect.

The effective amount of each material to be used in lowering the body temperature is related to the amount of lowering desired, the rate at which the temperature is to be lowered and the duration of the period during which the temperature is lowered. The compositions are essentially nontoxic so that large amounts of the compounds can be administered. Doses of compounds (a) and (c) ranging from 250 mg./kg. to 1000 mg./kg. can be used, and doses of (c) ranging from 250 mg./kg. up to 2000 mg./kg. can be used with more of the dilute composition being added if necessary to increase the temperature lowering. The manner of administering the composition is not critical, however, the subsequent techniques to be used should be considered so as not to interfere. In view of the ready solubility of the compounds in water, aqueous solutions can be easily and accurately prepared for use and this is the preferred mode of administering the compositions.

The compositions of the present invention are particularly useful for reducing high body temperature (antipyretic) and for lowering normal body temperatures (hypothermic). The latter property is particularly useful in medical techniques where it is desirable to lower the body temperature in order to slow down bodily functions such as respiration and heart beat. It has now been found that the body temperature of a mammal can be lowered several degrees by the administration of the compositions of the present invention.

What is claimed is:

1. A composition for lowering the body temperature of a warm-blooded mammal comprising a pharmaceutically acceptable carrier selected from the group consisting of water and an isotonic saline solution and an effective amount of a member selected from the group consisting of 4,5,5-trimethyl-4-hydroxy-1,3-oxazolidin-2-one and 4,5,5-trimethyl-4-hydroxy-3-hydroxyethyl-1,3-oxazolidin-2-one.

2. A composition for lowering the body temperature of a warm-blooded animal comprising a pharmaceutically aceptable carrier a member selected from the group consisting of water and an isotonic saline solution and an effective amount of 4,5,5-trimethyl-4-hydroxy-1,3-oxazolidin-2-one.

3. A composition for lowering the body temperature of a warm-blooded animal comprising a pharmaceutically acceptable carrier selected from the group consisting of water and an isotonic saline solution and an effective amount of 4,5,5-trimethyl-4-hydroxy-3-hydroxyethyl-1,3-oxazolidin-2-one.

4. A method of lowering the body temperature of a warm-blooded mammal comprising administering by injection to said warm-blood animal an effective amount of a member of the group consisting of 4,5,5-trimethyl-4-hydroxyl-1,3-oxazolidin-2-one and 4,5,5-trimethyl-4-hydroxy-3-hydroxyethyl-1,3-oxazolidin-2-one.

5. A method of lowering the body temperature of a warm-blooded mammal comprising administering by injection to said warm-blood animal an effective amount of 4,5,5-trimethyl-4-hydroxy-1,3-oxazolidin-2-one.

6. A method of lowering the body temperature of a warm-blooded mammal comprising administering by injection to said warm-blood animal an effective amount of 4,5,5 - trimethyl-4-hydroxy-3-hydroxyethyl-1,3-oxazolidin-2-one.

References Cited

UNITED STATES PATENTS 2,575,694 11/1951 Spielman.
2,251,836 5/1966 Fischer et al.

STANLEY J. FRIEDMAN, Primary Examiner

U.S. Cl. X.R.

424—248; 260—307.3

UNITED STATES PATENT OFFICE
CERTIFICATE OF CORRECTION

Patent No. 3,538,222  Dated November 3, 1970

Inventor(s) JULIUS G. SHUKYS

It is certified that error appears in the above-identified patent and that said Letters Patent are hereby corrected as shown below:

CORRECTED COPY                              CORRECTED COPY

Col.1, line 14, "aplication" should read --application--.

Col.2, line 20, "know" should read --known--.

Col.3, line 29, "and" should read --an--.
      line 30, after "ranging" insert --from--.
      line 39, "composition" should read --compositions--
      line 55, "temperature" should read --temperatures-- line 71, after "animal" insert --by--.
      line 75, "composition" should read --compositions--

Col.4, line 34, after "of" insert --the--.
      line 45, "5.0" should read -- -5.0 --.

Col.5, line 14, "aceptable" should read --acceptable--.
      line 14, after "carrier" delete --a member--.

Col.6, line 4, "hydroxyl" should read --hydroxy--.

Signed and sealed this 22nd day of June 1971.

(SEAL)
Attest:

EDWARD M. FLETCHER, JR.          WILLIAM E. SCHUYL
Attesting Officer                 Commissioner of P